(12) United States Patent
Paxson

(10) Patent No.: US 6,327,344 B1
(45) Date of Patent: Dec. 4, 2001

(54) ENHANCED NETWORK SUBSCRIBER SERVICE (ENSS)

(75) Inventor: Dana W. Paxson, Rochester, NY (US)

(73) Assignee: Northern Telecom Limited, Montreal (CA)

(*) Notice: Subject to any disclaimer, the term of this patent is extended or adjusted under 35 U.S.C. 154(b) by 0 days.

(21) Appl. No.: 09/185,492

(22) Filed: Nov. 3, 1998

(51) Int. Cl.[7] .................................................. H04M 1/64
(52) U.S. Cl. ............................. 379/88.01; 379/207.11; 379/211.02
(58) Field of Search .................................. 379/213, 211, 379/188, 189, 199, 88.01, 207.11

(56) References Cited

U.S. PATENT DOCUMENTS

| | | | | |
|---|---|---|---|---|
| 4,266,098 | * | 5/1981 | Novak ................................. | 379/142 |
| 4,850,013 | * | 7/1989 | Rose .................................... | 379/199 |
| 4,979,206 | * | 12/1990 | Padden et al. ..................... | 379/213 X |
| 5,781,616 | * | 7/1998 | Youngs et al. ..................... | 379/213 X |

* cited by examiner

Primary Examiner—Creighton Smith
(74) Attorney, Agent, or Firm—Hunton & Williams

(57) ABSTRACT

The Enhanced Network Subscriber Service (ENSS) operates with a public switched telephone network 200. A caller 112 enters a number which is in service, but belonging to subscriber 114 who is a registered member of the ENSS. The call triggers an intercept at the SW 110. The SW 110 signals the CCP. The CCP 116 searches the NSHDB 108 for the called number and its subscribers, past and present, and their associated access codes. If the called number is found, the CCP 116 signals the AS 120 to request an access code from the caller. An Audio System 120 conducts a dialog with the caller to obtain the required access code, using either DTMF or voice recognition, and forwards the access code to the CCP 116. The CCP 116 compares the submitted code to the access code(s) for the current subscriber. If it matches one of these codes, the CCP 116 conferences in the number corresponding to the code, and drops off the call.

13 Claims, 1 Drawing Sheet

ENHANCED NETWORK SUBSCRIBER SERVICE (ENSS)

FIELD OF THE INVENTION

This invention allows a caller whose call has not reached the desired party (i.e., person is no longer at the called number, call sent to Intercept) to receive optional additional call connection service, including, but not restricted to, automatic connection to a directory-assistance operator.

BACKGROUND

From the subscriber's perspective, calls which are intended for a prior subscriber are often annoying and sometimes harassing. Recent acceleration of the rate of change of assigned telephone numbers (increased 'churn') has increased significantly the problem of calls going to the wrong party; the shortened length of time a number can be held out of service means that within a few months a reassigned number will receive calls from callers still attempting to reach the previous subscriber. This problem is not addressed by number intercept, since the called number has a new valid subscriber.

A consequence is that a single number carries its history with it. Callers who use their own databases of telephone numbers, which are not maintained synchronously with the telephone system, dial the reassigned number and contact the later subscribers instead of persons they had intended to reach. When such calls concern debts owed by the prior subscriber, or other such adverse needs motivating the call, the subscriber receiving the call unjustly bears the adverse burden. The telephone company (telco) currently has no way to relieve the burden apart from reassigning the innocent subscriber's phone number once again. The causative problem, that is, the inaccurate number used by the caller, remains uncorrected. Further, the reassignment of the subscriber's number carries no guarantee that the newly-assigned number will be free of adverse history.

The invention resolves the subscriber's problem, and motivates callers to obtain and maintain accurate data concerning those they wish to contact. It further lessens the burden of complaints that are handled by the telco.

From the caller's perspective, failing to connect to the desired party is a single problem. The caller wants to make the connection regardless of whether the failure was due to a recent change of service for the desired party, to a not-recent change of service (in which case the number used has been reassigned to a new subscriber), to an incorrectly-stored or incorrectly-entered number. The invention provides the caller with a clear distinction among these three cases, and optionally offers the caller a directory-assistance search in the process, all of which simplifies the caller's task.

Even when intercepted, the called party's new number is not always provided or available. This necessitates a separate call to directory assistance on the caller's part. The invention obviates the need for a separate call to directory assistance in this case.

SUMMARY

The invention provides a method and apparatus for improving subscriber telephone service. The method includes the steps of providing the subscriber with a protective access code so that calls to the subscriber are intercepted and the caller is queried for the correct access code. If the correct access code is given, the call is completed. If the access code is incorrect, it is compared to access codes in an historical database of access codes to identify another subscriber associated with said other access code. If the caller requests further directory assistance, the caller is provided with current information on the party with the access code given by the caller. The method of the invention includes providing subscribers with one or more access codes for connecting different callers to different subscriber services such as voice mail of direct connection. The invention is embodied in a telephone network with an enhanced network subscriber system (ENSS). It includes a first computer with a first database for storing a plurality of access codes, each access code associated with a subscriber. A suitable switch that connects a caller to a subscriber includes means for preventing connection of a call to the subscriber unless the caller provides at least one of one or more access codes authorized by the subscriber. The switch has means for intercepting the call to a subscriber when the caller uses an access code not authorized by the subscriber. As supplemental directory assistance feature has means for providing the caller with a history of users of the called number.

The invention has numerous advantages over the conventional system. It provides a positive answer to the problem of churning for the subscriber and for the caller. The invention treats the caller's connection-failure problem as a single problem and simplifies the caller's efforts to complete connection. It offers the telecommunications company supplying the intercept and directory-assistance services a significant revenue-earning opportunity by increasing the proportion of automated directory-assistance traffic and potential chargeable call completions. The invention reduces intercept traffic and repeat wrong-number traffic. The telecommunications company supplying the intercept and directory-assistance services improves its customer relations by offering a significant public-service enhancement, with positive impact on its public image. The invention offers the telco supplying regional or national directory-assistance services a significant revenue-earning opportunity by increasing the potential search traffic to such companies from the company offering the invention's service. The invention offers the subscriber protection from unwanted calls, of several types: a caller trying an outdated number assignment, a fax machine or model autodialer with a wrong number, an annoyance caller, or a normal wrong number call.

DETAILED DESCRIPTION

Figure 1:
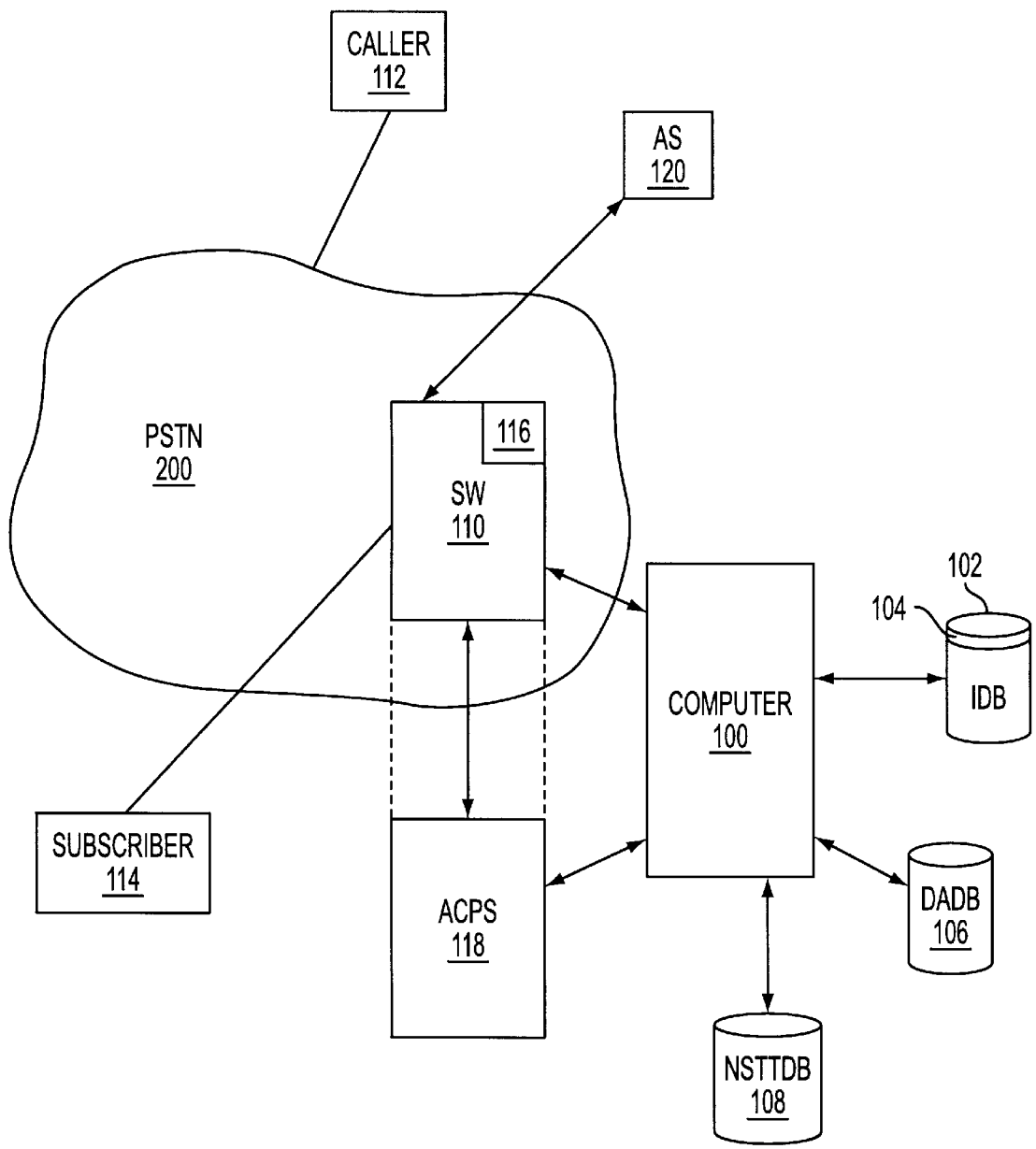
FIG. 1 is a schematic diagram of a telephone system equipped with the invention.

The public switched telephone network (PSTN) 200 is operated by a telephone company and includes the switch (SW) 110, its internal computing subsystems, and its connections to the switching network 200, the caller 112, an adjunct call-processing system (ACPS) 118, and, optionally, an audio subsystem (AS) 120. The AS 120 has speech-recognition capability for recognizing the name of the requested items as spoken by any caller.

The ENSS includes a computer 100 with an intercept database (IDB) 102 and supporting access software 104. The IDB 102 includes those numbers that the telephone company has designated for interception, including numbers that have been disconnected, ones that are no longer in service and ones that have been assigned one or more access codes. The computer 100 may also have access to a directory-assistance database (DADB) 106 with supporting access software, and, optionally, to a number screening history database (NSHDB) 108, with supporting access software. The NSHDB 108 contains each number available for service, along with a history of listing subscribers over a time period controlled by the supplying telephone company.

The switch (SW) 110 controls the call from a caller 112 to a subscriber 114. The SW 110 has a software program (call control processing, or CCP) 116 resident either in the SW 110 itself or in an adjunct call-processing system (ACPS) 118, which conducts the call-control coordination necessary to activate an automated audio dialog with the caller, access the directory-assistance database, and access the number history database.

The public switching telephone network receives a call from a caller on a central office switch SW 110. The SW 110 connects to ACPS 118 and to AS 120 at one switch. The ACPS 118 is connected in a computer network to computer 100. Via computer 100, the ACPS 118 connects to the IDB 102, DADB 106 and NSHDB 108. Through the SW 110, the ACPS 118 connects to the AS 120.

THE OPERATION OF THE INVENTION

In operation, the invention performs or entails two major processes: registration, and connection. Registration establishes or maintains the enhanced number subscriber service for a requesting subscriber, and is a routine service-management process. Connection takes one of three forms. Service-Initiated Screening and Directory Connection, the central feature of this invention, handles all calls for subscriber 114's number. Caller-initiated Directory Connection provides caller 112 with access to subscriber number history for a requested subscriber or number. As an extension to the ordinary Intercept service, Automated Intercept Directory Connection handles all calls for a disconnected number.

Embodiment A

In one form of the invention, the SW 110 and ACPS 118 are combined in a single system and enable the following processes.

Service-Initiated Screening and Directory Connection (SISDC)

The caller 112 enters a number which is in service, but belonging to subscriber 114 who is a registered member of ENSS. The call triggers an intercept at the SW 110. SW 110 signals the CCP 116 (either in the SW 110 itself or in the ACPS 118) and the AS 120 with the status of the intercept. The SW 110 activates a voice link to the AS 120. The CCP 116 activates a data link to the AS 120.

The CCP 116 searches the NSHDB 108 for the called number and its subscribers, past and present, and their associated access codes. If the called number is found, the CCP 116 signals the AS 120 to request an access code from the caller. The AS 120 conducts a dialog with the caller to obtain the required access code, using either DTMF or voice recognition, and forwards the access code to the CCP 116.

The CCP 116 compares the submitted code to the access code(s) for the current subscriber. If it matches one of these codes, the CCP 116 conferences in the number corresponding to the code, and drops off the call. The availability of multiple access codes per subscribed number allows varied services to be invoked, based on use of the code to map the dialed number to a potentially-different number stored in the NSHDB 108.

If the submitted access code fails to match any of the current subscriber's codes, it is compared to any access codes for earlier subscribers. If it matches one of these codes, the CCP 116 signals the AS 120 with a found-earlier-subscriber status of the search, which may include identifying information concerning that subscriber. If the submitted access code fails to match any access code for earlier subscribers, the CCP 116 signals the AS 120 with the failed status of the search. The AS 120 conducts a dialog with the caller to announce the results of the search of the NSHDB 108 and offer the caller a directory assistance connection.

The caller responds. A positive response continues the process; any other response terminates the call at this point. The AS 120 conducts a dialog with the caller to determine the name and location of the desired party. The rest of the call processing continues as for normal directory assistance. Additional services such as national directory search or voicemail may be offered at this stage.

Caller-Initiated Directory Connection (CIDC)

The caller enters a directory-assistance number which provides operator-mediated access to the NSHDB 108, as an adjunct of the DADB 106. The SW 110 initiates a normal directory-assistance call setup. The caller 112 requests a number history search, supplying the needed data i.e., a subscriber name, location, street, etc. This request may be fielded either directly by the operator, or by the AS 120. The operator searches the NSHDB 108. The search may be keyed by name, by number, or by other information in the NSHDB 108. The operator reports the results of the search to the caller. This report may also be performed via the normal directory-assistance AS 120.

Registration of Enhanced Network Subscriber Service (RENSS)

A subscriber 114 who wishes to register for the proposed service contacts the providing telecommunications service (the telco). The subscriber 114 and the telco establish an access code value for direct connection. Optionally, they may establish one or more additional access codes which perform other functions, such as forwarding to voicemail, forwarding to another number, or selecting services such as fax, data or electronic mail.

The telco stores the code(s) with the number in the NSHDB 108, together with the effective date of the change (s) of service, and the termination date of the change(s) of service, if any. The telco stores an indicator in the IDB 102 for the subscriber's line, indicating the presence of the proposed service for the line number. The telco stores an indicator in the subscriber's end-office switch 110 to indicate that the subscriber's line is not in normal service, and that an intercept should be performed when that number is called.

Automated Intercept Directory Connection (AIDC)

AIDC service includes additional features enabled by the invention. It completes the set of services for the caller trying to reach a number for which the caller's expectations of reaching a given subscriber cannot be met, and as such constitutes a useful added component to the basic invention. It is a simple extension to the current Intercept service that takes advantage of the availability of regional and national directory-assistance resources.

The caller enters a number which is not in service, triggering an intercept at the SW110. The SW110 signals the CCP 116 (either in the Sw110 itself or in the ACPS) and the AS 120 with the status of the intercept. The CCP 116 searches the IDB for the called number. If the called number has a new number associated with it, the CCP 116 follows the normal intercept announcement with call-completion offered as configured, and then drops off the call. If the called number has no new number associated with it, the CCP 116 continues with the AIDC process.

The SW 110 activates a voice link to the AS 120. The CCP 116 activates a data link to the AS 120. The AS 120 conducts a dialog with the caller to offer the directory assistance connection. The caller responds. A positive response continues the process; any other response terminates the call at this point. The AS 120 conducts a dialog with the caller to determine the name and location of the desired party. The rest of the call processing continues as for normal directory assistance. Additional services such as national directory search or voicemail may be offered at this stage.

ALTERNATE EMBODIMENTS OF THE INVENTION

Embodiment B

In a different form of the invention, the SW 110 and ACPS 118 do not co-reside, but the processes as described above for embodiment A operate in the same manner, with the addition of an intersystem path between the SW 110 and the CCP 116 which is now resident in the ACPS 118.

Embodiment C

In a different embodiment of the invention, the co-residence of the SW 110 and ACPS 118 may take either of the embodiments described in Invention Embodiment A or Invention Embodiment B; the distinguishing aspect of Embodiment C is the arrangement of the data in the IDB 102, the DADB 106 and the NSHDB 108. In Embodiments A and B, they are all separate databases, managed and accessed independently. In Embodiment C, the data elements of these databases are treated as elements of a single distributed database, managed and accessed as such. The processes as described for Embodiment A operate in the same manner as for that embodiment.

Embodiment D

In a different embodiment of the invention, the co-residence of the SW110 and ACPS 118 may take either of the embodiments described in Invention Embodiment A or Invention Embodiment B. The distinguishing aspect of Embodiment D, as in Embodiment C, is the arrangement of the data in the IDB, the DADB 106 and the NSHDB 108. In Embodiment D, the data elements of the DADB 106 and the NSHDB 108 are treated as elements of a single distributed database, managed and accessed as such, while the IDB is still treated as a separate entity. The processes as described for Embodiment A operate in the same manner as for that embodiment.

Embodiment E

In a different embodiment of the invention, the co-residence of the SW 110 and ACPS 118 ma take either of the embodiments described in Invention Embodiment A or Invention Embodiment B; the distinguishing aspect of Embodiment E, as in Embodiments C and D, is the arrangement of the data in the IDB_102, the DADB 106 and the NSHDB 108. In Embodiments E, the data elements of the IDB 102 and the NSHDB 108 are treated as elements of a single distributed database, managed and accessed as such, while the DADB 106 is still treated as a separate entity. The processes as described for Embodiment A operate in the same manner as for that embodiment.

ILLUSTRATIVE EXAMPLES

Caller Interaction With Service-Initiated Screening and Directory Connection

In the dialogs below, the normal text indicates either human speech or routine automated announcements. The italic text indicates variable announcement content, if present.

Changed Number

The caller enters a number for which the desired party has ceased use; the number has been reassigned to another subscriber who has requested Enhanced Network Subscriber Service. An automated announcement (from the AS 120) says: "You have reached a subscriber to the Enhanced Network Subscriber Service. Please enter the access code for this number, followed by a pound-sign. You may instead speak the numbers of the access code in order." (This entire message can be replaced by a brief series of distinctive tones to prompt the caller; failure to respond to the tones can then elicit the voice message prompt. The initial use of tone prompts facilitates automated caller input, as from a modem or fax machine.)

Caller: "Four Three Seven Two Two Six."

AS: "The access code you have entered, 437226, applies to a former subscriber for the called number. If you wish to be connected to a Directory Assistance operator for help in locating that subscriber, please say 'yes'."

Caller: "Yes."

The rest of the call proceeds as a standard Directory Assistance call, with possible searches against regional and national databases.

Current Number

The caller enters a number for which the subscriber has requested Enhanced Network Subscriber Service. An automated announcement (from the AS 120) says: "You have reached a subscriber to the Enhanced Network Subscriber Service. Please enter 15 the access code for this number, followed by a pound-sign. You may instead speak the numbers of the access code in order."

Caller: "Four Three Five Eight One One."

AS: "Thank you."

The rest of the call proceeds as an ordinary call.

Wrong Number

The caller enters a number for which the subscriber has requested Enhanced Network Subscriber Service. An automated announcement (from the AS 120) says: "You have reached a subscriber to the Enhanced Network Subscriber Service. Please enter the access code for this number, followed by a pound-sign. You may instead speak the numbers of the access code in order."

Caller: "Four Three Five Eight One One."

AS: "The access code you have entered, 435811, is not correct for the number you called, 787-420-3393. If you wish to be connected to a Directory Assistance operator for help in locating the subscriber you are calling, please say 'yes'."

Caller: "Yes."

The rest of the call proceeds as a standard Directory Assistance call, with possible searches against regional and national databases.

Current Number With Multiple Services

The caller, wanting only to leave a message, enters a number for which the subscriber has requested Enhanced Network Subscriber Service. An automated announcement (from the AS 120) says: "You have reached a subscriber to the Enhanced Network Subscriber Service. Please enter the access code for this number, followed by a pound-sign. You may instead speak the numbers of the access code in order."

Caller enters '976332#' (the voicemail access code; a different code would ring the subscriber's phone).

AS: "Please leave your voice message after the tone."

The rest of the call proceeds as an ordinary voicemail call.

This invention may be realized not only in a standard telephony environment (PSTN, or public switch telephone network), but also in a voice-over-Internet (VoIP) environment. The problems presented by re-use of identifiers for successive customers, inability to locate a called party, lack of number or identifier history information, lack of protective access codes, and the need to obtain directory service remain the same; the proposed invention addresses them in the same manner. The only changes consist in the placement and underlying technology of the components providing the invention's services. In both environments, these services remain essentially the same in spirit and scope.

Having thus described my invention, those skilled in the art will understand that the invention may be changed by making additions, deletions or other modifications without departing from the spirit and scope as set forth in the following claims.

What is claimed is:

1. A method for improving subscriber telephone service comprising the steps of:

protecting a telephone number of a subscriber with an authorized access code;

intercepting a call made to the protected telephone number;

completing the call when the caller provides the authorized access code;

preventing completion of the call when the caller does not provide the authorized access code; and providing the caller with a history of subscribers for the protected telephone number.

2. The method of claim 1 wherein the subscriber has one or more access codes for connecting different callers to different subscriber services.

3. The method of claim 2 wherein the subscriber has a different access code for connecting a caller to different subscriber services.

4. The method of claim 3 wherein the services include one or more of the group consisting of a voice connection to the subscriber, a voice mailbox of the subscriber and a facsimile machine of the subscriber.

5. The method of claim 1 comprising the further step of connecting the caller to a directory assistance service when the access code given by the caller does not match the access code of the subscriber with the number called by the caller.

6. In a telephone network an enhanced network subscriber system (ENSS) comprising:

a computer with a database for storing a plurality of access codes, each access code associated with particular subscribers;

means for preventing connection of a call to a particular subscriber unless a calling party provides one or more access codes authorized by the particular subscriber;

means for intercepting the call to the particular subscriber when the calling party does not provide an access code authorized by the particular subscriber; and means for providing the calling party with a history of subscribers for a telephone number where the call to the particular subscriber has been intercepted.

7. The enhanced ENSS of claim 6 further comprising means for connecting the caller to directory assistance after providing the caller with a history of the called number.

8. The enhanced ENSS of claim 6 wherein the history of a number includes for one or more prior subscribers their name and location.

9. The enhanced ENSS of claim 8 further comprising means for connecting the caller to directory assistance to provide the current number and location for the prior subscriber.

10. The ENSS of claim 6 further comprising a number history database for comparing the unauthorized access code to one or more historical access codes previously associated with the called number.

11. The ENSS of claim 6 further comprising a directory assistance database for generating a current telephone number operatively associated with the unauthorized access code.

12. The ENSS of claim 6 wherein the telephone network is a public switched telephone network.

13. The ENSS of claim 6 wherein the telephone network comprises a voice over Internet connection.

* * * * *